United States Patent [19]
Gáetzi

[11] 3,896,160
[45] July 22, 1975

[54] AMIDINOCARBAMATES

[75] Inventor: Karl Gáetzi, Basel, Switzerland

[73] Assignee: Ciba-Geigy Corporation, Ardsley, N.Y.

[22] Filed: Mar. 9, 1972

[21] Appl. No.: 233,292

[30] Foreign Application Priority Data
Mar. 17, 1971 Switzerland.......................... 3931/71
Feb. 3, 1972 Switzerland.......................... 1612/72

[52] U.S. Cl....... 260/482 C; 260/465 D; 260/465.4; 260/470; 260/471 C; 260/482 B; 424/300
[51] Int. Cl.......................................... C07c 125/06
[58] Field of Search .................. 260/482 R, 482 C

[56] References Cited
UNITED STATES PATENTS
3,564,041  2/1971  Farrissey et al................. 260/482 C

*Primary Examiner*—Anton H. Sutto
*Assistant Examiner*—Paul J. Killos
*Attorney, Agent, or Firm*—Frederick H. Rabin

[57] ABSTRACT

New carbamates of the formula

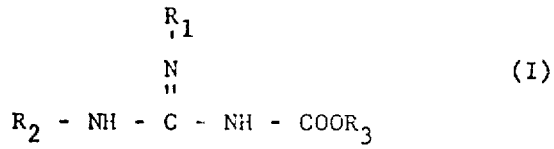

wherein $R_1$ represents hydrogen or, if $R_2$ represents an optionally substituted phenyl radical, also a group $-COOR_3$, $R_2$ represents an optionally substituted alkyl, aralkyl or phenyl radical, and $R_3$ represents an alkyl radical containing from 1 to 4 carbon atoms, their manufacture and their use for combating phytopathogenic fungi are disclosed.

3 Claims, No Drawings

AMIDINOCARBAMATES

The present invention relates to amidinocarbamates and salts thereof, process for their manufacture, their use in plant protection, especially in the form of active substances in agents for combating phytopathogenic fungi, and also to a process for combating phytopathogenic fungi wherein there are used the new active substances and agents containing them.

The amidinocarbamates of the present invention have the formula

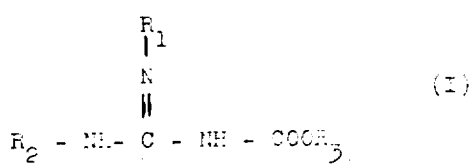

wherein $R_1$ represents hydrogen or, if $R_2$ represents an optionally substituted phenyl radical, also a group $—COOR_3$, $R_2$ represents an optionally substituted alkyl, aralkyl or phenyl radical, and $R_3$ represents an alkyl radical containing from 1 to 4 carbon atoms.

The alkyl radicals represented by $R_2$ in the formula I contain from 4 to 15 carbon atoms, are straight-chain or branched, interrupted by hetero atoms or hetero groups such, for example as

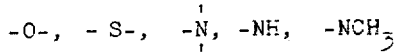

and are unsubstituted or mono- to trisubstituted by halogen atoms such as fluorine, chlorine, bromine or iodine, or substituted by a hydroxyl, mercapto, nitro, cyano or amino group, by a (lower alkyl)amino group containing from 1 to 4 carbon atoms in the alkyl radical, preferably a methyl or ethylamino group, or by a di-(lower alkyl)-amino group containing from 1 to 4 carbon atoms in the alkyl radicals, preferably a dimethylamino or diethylamino group.

Alkyl radicals containing from 4 to 15 carbon atoms are to be understood as meaning in particular n-, i-, sec. and tert.butyl, straight-chain and branched pentyl, n-hexyl, n-octyl, n-decyl, n-dodecyl and n-tetradecyl radicals or also the groups $CH_3\text{-}NH\text{-}(CH_2)_6\text{-}$; $C_2H_5\text{-}NH(CH_2)_{10}\text{-}$; $C_3H_7\text{-}NH(CH_2)_6\text{-}$; $C_4H_9\text{-}NH(CH_2)_6\text{-}$; $C_6H_{13}\text{-}NH(CH_2)_4$; $C_8H_{17}\text{-}NH(CH_2)_3\text{-}$; $C_{14}H_{29}\text{-}NH(CH_2)\text{-}$ Aralkyl radicals represented by $R_2$ in the formula I are made up of an aryl and alkylene part. By this alkylene part is meant a straight-chain or branched alkylene radical containing from 1 to 4 carbon atoms, in particular a

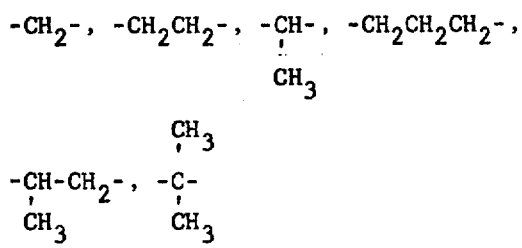

or a tetramethylene radical. By the aryl part of an aralkyl radical $R_2$ is meant preferably a phenyl radical. Such a phenyl radical, as also a phenyl radical $R_2$ in the formula I, is optionally substituted, and then mono- or di-, but preferably trisubstituted, by halogen atoms such as fluorine, chlorine, bromine or iodine, alkyl groups containing from 1 to 4 carbon atoms which are straight-chain or branched, preferably methyl or ethyl groups; by alkoxy and alkylthio groups each containing from 1 to 4 carbon atoms and whose alkyl part is straight-chain or branched and preferably represents methyl or ethyl; by amino groups, (lower alkyl)amino or di(-lower alkyl) amino groups whose alkyl parts each contain from 1 to 4 carbon atoms, are straight-chain or branched and represent preferably a methyl or ethyl group; by hydroxyl groups, mercapto groups, nitro groups, cyano groups and trifluoromethyl groups.

The alkyl radicals represented by $R_3$ in the groups $-COOR_3$ in the formula I are methyl, ethyl, n-propyl, i-propyl, n-, i-, sec. and tert.butyl radicals.

Particularly interesting compounds for use in plant protection are those of the formula

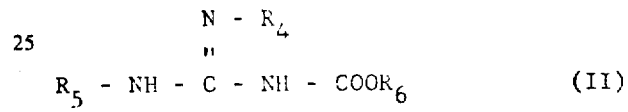

wherein $R_4$ represents hydrogen or, if $R_5$ represents a phenyl radical which is optionally mono- or disubstituted by chlorine atoms or methyl groups, a group $—COOR_7$, in which $R_7$ is methyl or ethyl, $R_5$ represents a straight-chain or branched alkyl radical containing from 4 to 15 carbon atoms which is optionally interrupted by $—O—$, $—S—$, $—NH$ or $—NCH_3$, a phenyl radical which is optionally mono- or disubstituted by chlorine atoms or methyl groups, or represents a benzyl radical, and $R_6$ represents an alkyl radical containing from 1 to 4 carbon atoms.

Preferred compounds of the formula II have the formula

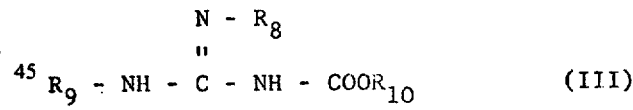

wherein $R_8$ represents hydrogen or, if $R_9$ represents a phenyl radical which is optionally mono- or disubstituted by chlorine atoms or methyl groups, also a group $-COOR_{10}$, $R_9$ represents a straight-chain alkyl radical containing from 4 to 15 carbon atoms which is interrupted by

or a phenyl radical which is optionally mono- or disubstituted by chlorine atoms or methyl groups, and $R_{10}$ represents methyl or ethyl.

Examples of alkyl radicals $R_5$ and $R_9$ in the formulae II and III correspond to those given hereinabove for alkyl radicals $R_2$ in formula I.

On account of their phytofungicidal properties, particularly preferred compounds according to the present invention are:

$N^1$-n-butyl-O-methyl-amidinocarbamate
$N^1$-n-decyl-O-methyl-amidinocarbamate
$N^1$-n-dodecyl-O-methyl-amidinocarbamate N¹-[3-(n-dodecylamino)-propyl-(1)]-O-methyl-amidinocarbamate
N¹-n-tetradecyl-O-methyl-amidinocarbamate
N¹-phenyl-N²-ethoxycarbonyl-O-ethyl-amidinocarbamate
N¹-4-chlorophenyl-N²-methoxycarbonyl-O-methyl-amidinocarbamate
N¹-4-chlorophenyl-N²-ethoxycarbonyl-O-ethyl-amidinocarbamate.

The amidinocarbamates of the formulae I, II, and III, in which the substituents represented by $R_2$, $R_3$ and $R_4$ contain an amino group which is capable of forming addition salts, can be converted into the corresponding addition salts by reaction with inorganic or organic acids in a manner known per se. The following acids are suitable for the formation of the addition salts: hydrohalic acids, such as hydrochloric acid, hydrobromic acid, phosphoric acid, sulphuric acid, fluoroboric acid ($HBF_4$), perchloric acid, alkylsulphuric acids, such as methyl- or ethylsulphuric acid, naphthoic acids, benzoic acids, halobenzoic acids, acetic acid, haloacetic acids, such as trichloroacetic acid, aminoacetic acid, propionic acid, halopropionic acid, butyric acid, lactic acid, stearic acid, aliphatic dicarboxylic acids, such as oxalic acid, tartaric acid, maleic acid etc.

The amidinocarbamates of the formula I are obtained according to the present invention by reacting an isothiourea derivative of the formula IV

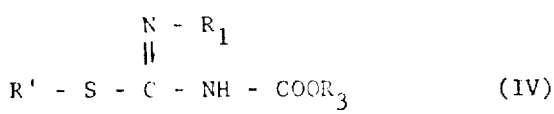

in which $R_1$ and $R_3$ have the meanings given under formula I and R' represents an alkyl radical containing from 1 to 2 carbon atoms, with an amine of the formula $$R_2 - NH_2$$

(V)

wherein $R_2$ has the meaning given under formula I, and, if desired, converting a compound of the formula I, in which $R_1$ represents a group $-COOR_3$, $R_2$ represents an optionally substituted phenyl radical and $R_3$ represents an alkyl radical containing from 1 to 4 carbon atoms, in a manner known per se by hydrolysis and decarboxylation into a compound of the formula I, in which $R_1$ represents hydrogen, $R_2$ represents an optionally substituted phenyl radical and $R_3$ represents an alkyl radical containing from 1 to 4 carbon atoms. The reaction of compounds of the formulae IV and V takes place in the presence of solvents or diluents which are inert towards the reactants. The reaction temperatures are preferably in the range from 0° - 150°C, preferably 20°-120°C.

Where $R_2$ represents an alkyl or aralkyl radical according to the definition for formula I, or where $R_1$ stands for the group $-COOR_3$ and $R_2$ for an optionally substituted phenyl group, preferred starting materials for the process described are isothiourea derivatives of the formula IV, in which $R_1$ represents the $-COOR_3$ group, since these compounds are obtained in higher yields and greater purity by reacting S-alkylisothiourea with a haloformic ester. There are obtained in this case compounds of the formula

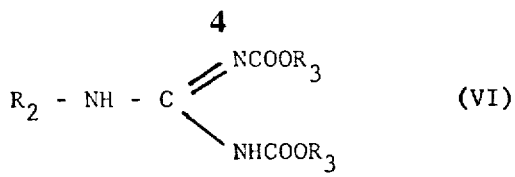

Where $R_2$ represents an alkyl or aralkyl radical, these N²-alkoxycarbonyl-amidinocarbamates are more unstable than the corresponding N¹-phenyl derivatives. The one $-COOR_3$ substituent is split off under the conditions which are usual during the processing. The N²-alkoxycarbonyl-N¹-phenyl-amidinocarbamates are stable under the same conditions and can be isolated without difficulty. From these carbamates it is then possible to obtain in known manner, by hydrolysis and decarboxylation, the corresponding N¹-phenyl-amidinocarbamates of the formula I. However, since hydrolysis and decarboxylation in most cases entail a loss in yield, it is preferably to use an S-alkyl-N-alkoxycarbonyl-isothiourea as starting material for the manufacture of the N¹-phenyl-amidinocarbamates.

Examples of solvents or diluents which are suitable for the process according to the invention are: aromatic hydrocarbons, for example benzene, toluene, petroleum ethers, chlorobenzene, polychlorobenzenes, bromobenzene; chlorinated alkanes containing 1 to 3 carbon atoms; ethers, for example dioxan, tetrahydrofuran; esters, for example ethyl acetate; ketones, for example methyl ethyl ketone, acetone, diethyl ketone; alcohols, for example methanol, ethanol, butanol; also nitriles, for example acetonitrile; N,N-dialkylated amides, such as dimethyl formamide etc.

The starting materials of the formulae IV and V used for the reaction according to the invention are known compounds or they can be manufactured analogously by processes which are known per se.

The active substances of the formula I possess excellent fungicidal properties against phytopathogenic fungi on various crop plants, such as cereals, maize, rice, vegetables, ornamental plants, fruit varieties, vines, farm products etc.

Using the new active substances it is possible to check or destroy fungus infections which have occurred on fruit, blossoms, leaves, stems and roots, and parts of plants which then grow later also remain free from such infections on account of the excellent systematic action. The active substances of the formula I are particularly active against phytopathogenic fungi belonging to the following classes, orders and species: Oomycetes, such as Plasmodiphora-species, Aphanomyces-species, Pythium-species, Phytophthora-species, e.g. (Phytophthora infestans, Phytophthora cactorum, Plasmopara-species, e.g. (Plasmopara viticola), Bremia-species (Bremia lactucae), Peronospora-species, e.g. (Peronospora tabacina), Pseudoperonospora-species, e.g. (Pseudoperonospora humuli).

Zygomycetes, such as Rhizopus-species.

Ascomycetes, such as Eurotiales, such as Aspergillus-species, Penicillium-species, e.g. (Penicillium digitatum, Penicillium italicum), Taphrinales, such as Taphrina-species, e.g. (Taphrina deformans), Erysiphases, such as Erysiphes-species, e.g. (Erysiphes Cichoracearum, Erysiphes graminis), Podosphaera leucotricha, Sphaerotheca-species (Sphaerotheca pannosa), Uncinula-species (Uncinula necator), Helotiales, such as Moni-

*linia*-species (*Monilinia* [*Sclerotinia*] *fructicola*, *Monilinia laxa*), *Diplocarpon*-species (*Diplocarpon rosae*), *Pseudo-peziza*-species, *Sphaeriales*, such as *Nectria*-species (*Nectria galligena*), *Ceratocystis*-species, *Pseudosphaeriales*, such as *Venturia*-species, (*Venturia inaequalis*), *Mycosphaerella*-species, *Ophiobolus*-species (*Ophiobolus graminis*), *Cochliobolus*-species ([*Helminthosporium*] *miyabeanus*), *Cercospora*-species (*Cercospora beticola*, *Cercospora musae*).

Basidiomycetes,
such as *Aphyllophorales*, *Pellicularia*-species, e.g. (*Pellicularia filamentora* = [*Rhizoctonia solani*]), *Uredinales* such as *Puccinia*-species, e.g. (*Puccinia triticina*), *Uromyces*-species (*Uromyces phaseoli*), *Hemileia*-species (*Hemileia vastatrix*), *Cronartium*-series (*Cronartium ribicola*), *Phragmidium*-species (*Phragmidium subcorticium*), *Gymnosporangium* species.

Denteromycetes = (*Fungi imperfecti*)
such as *Piricularia*-species, e.g. (*Piricularia oryzae*), *Corynespora*-species, *Thielaviopsis*-species, *Clasterosporium*-species, *Botrytis*-species (*Botrytis cinerea*), *Cladosporium*-species, Alternaria-species (*Alternaria solani*), *Verticillium*-species (*Verticillium albo-atrum*), *Phialophora*-species, *Melanconiales*, such as *Colletotrichum*-species, *Fusarium*-species, such as (*Fusarium oxysporum*, *Fusarium nivale*), *Gloesporium*-species (*Gloesporium fructigenum*), *Sphaeropsidales*, e.g. *Septoria*-species (*Septoria apicola*), *Diplodia*-species (*Diplodia natalensis*), *Mycelia sterilia*, e.g. *Sclerotium* series (*Sclerotium rolfsii*).

Moreover, the new active substances can be used for the treatment of seeds, fruit, tubers, etc., for the protection against fungus infections, e.g. as a result of smut fungi of all kinds, such as:

*Ustilaginales* such as *Ustilago*-species (*Ustilago avenae*), *Tilletia*-species (*Tilletia tritici*), *Urocystis*- and *Tuburcinia*-species, *Phoma*-species (*Phoma betae*).

The fungicidal agents according to the invention are manufactured in knonw manner by intimately grinding and mixing the active substances of the general formula I with suitable carriers, optionally with the addition of dispersing agents or solvents which are inert towards the active substances. The active substances may be used for manufacturing dusts, tracking agents, granules, coated granules, impregnated granules, homogeneous granules, wettable powders, pastes, emulsions, solvents or aerosols.

To manufacture solid preparations (dusts, tracking agents, granules), the active substances are mixed with solid carriers. For dusts, the particle size of the carriers is advantageously up to about 0.1 mm, for tracking agents from about 0.075 to 0.2 mm and for granules 0.2 mm or greater. The concentrations of active substance in the solid preparations are generally from 0.5 to 80 percent. It is also possible to add to these mixtures additives which stabilise the active substance and/or nonionic, anionic and cationic substances, which, for example, improve the adhesion of the active substances to plants and parts of plants (adhesives and agglutinants) and/or ensure an improved wettability (wetting agents) and dispersibility (dispersants).

The water-dispersible concentrates of the active substance, wettable powders, pastes and emulsion concentrates are agents which may be diluted with water to any desired concentration. They consist of active substance, carrier, surfactants and anti-foam agents and optionally solvents. The concentration of active substance in these agents is 5–80 percent. The wettable powders and pastes are obtained by mixing and grinding the active substances with dispersing agents and carriers in powder form in suitable devices until homogeneity has been attained. In many cases it is advantageous to use mixtures of different carriers. Suitable anti-foam agents are silicones etc. The active substances are so mixed, ground, sieved and passed with the above cited additives that, in the case of the wettable powders, the solid constituent does not exceed a particle size of 0.02 to 0.04 mm and, in the case of pastes, of 0.003 mm. Dispersing agents, organic solvents and water are used to manufacture emulsion concentrates. The solvents must be virtually odourless, not phytotoxic, inert towards the active substances and not readily inflammable.

In addition, it is possible to use the agents according to the invention in the form of solutions. To this end, one or more active substances of the general formula I are dissolved in suitable organic solvents, solvent mixtures or water. The solutions should contain the active substances in a concentration ranging from 1–20 percent.

Application forms of the active substances for plant protection are described as follows. The parts denote parts by weight, unless otherwise stated.

Wettable Powders

The following constituents are used to manufacture (a) a 10 percent and (b) a 50% wettable powder:

a. 10 parts of
$N^1$-n-butyl-O-methyl-amidinocarbamate or
$N^1$-n-octyl-O-methyl-amidinocarbamate or
$N^1$-n-dodecyl-O-methyl-amidinocarbamte or
$N^1$-[3-(n-dodecylamino)-propyl-(1)]-O-methylamidinocarbamate or
$N^1$-n-tetradecyl-O-methyl-amidinocarbamate or
$N^1$-phenyl-$N^2$-ethoxycarbonyl-O-ethyl-amidinocarbamate or
$N^1$-4-chlorophenyl-$N^2$-methoxycarbonyl-O-methylamidinocarbamate or
$N^1$-4-chlorophenyl-$N^2$-ethoxycarbonyl-O-ethylamidinocarbamate.

1 part of sodium dibutylnaphthalenesulphonate
4 parts of calcium lignine sulphonate
2 parts of a mixture of Champagne chalk and hydroxylethyl cellulose (1:1)
50 parts of kaolin
10 parts of sodium aluminium silicate 23 parts of Champagne chalk b. 50 parts of
$N^1$-[3-(n-dodecylamino)-propyl-(1)]-O-methylamidinocarbamate or
$N^1$-n-butyl-O-methyl-amidinocarbamate or
$N^1$-n-octyl-O-methyl-amidinocarbamate or
$N^1$-n-dodecyl-O-methyl-amidinocarbamate or
$N^1$-n-tetradecyl-O-methyl-amidinocarbamate or
$N^1$-phenyl-$N^2$-ethoxycarbonyl-O-ethyl-amidinocarbamate or
$N^1$-4-chlorophenyl-$N^2$-methoxycarbonyl-O-methylamidinocarbamate or
$N^1$-4-chlorophenyl-$N^2$-ethoxycarbonyl-O-ethylamidinocarbamate.

2 parts of octylphenoxyethylene glycol with 9–10 mols of ethyleneoxy groups per mol of phenol 2 parts of a mixture of Champagne chalk and hydroxyethyl cellulose (1:1)
3 parts of heptadecyl-hydroxyethyl-imidazoline
43 parts of kaolin.

The active substances were intimately mixed in suitable mixers and ground in mills and rollers. Wettable powders are obtained which can be diluted with water to form suspensions of any desired concentration. Such suspensions are used principally for protecting parts of plants above the soil.

Dusts

The following substraces are used to manufacture a 5% dust:
5 parts of
  $N^1$-n-butyl-O-methyl-amidinocarbamate or
  $N^1$-n-octyl-O-methyl-amidinocarbamate or
  $N^1$-n-dodecyl-O-methyl-amidinocarbamate or
  $N^1$-[3-(n-dodecylamino)-propyl-(1)]-O-methylamidinocarbamate or
  $N^1$-n-tetradecyl-O-methyl-amidinocarbamate or
  $N^1$-phenyl-$N^2$-ethoxycarbonyl-O-ethyl-amidinocarbamate or
  $N^1$-4-chlorophenyl-$N^2$-methoxycarbonyl-O-methylamidinocarbamate or
  $N^1$-4-chlorophenyl-$N^2$-ethoxycarbonyl-O-ethylamidinocarbamate
95 parts of talcum.

The above active substances are intimately mixed with the carriers and ground. The resulting fungicide dusts are used for treating seed-bed soil or for dusting plants.

Emulsion

To manufacture a 5 percent emulsion concentrate
5 parts of
  $N^1$-n-butyl-O-methyl-amidinocarbamate or
  $N^1$-n-octyl-O-methyl-amidinocarbamate or
  $N^1$-n-dodecyl-O-methyl-amidinocarbamate or
  $N^1$-[3-(n-dodecylamino)-propyl-(1)]-O-methylamidinocarbamate or
  $N^1$-n-tetradecyl-O-methyl-amidinocarbamate or
  $N^1$-phenyl-$N^2$-ethoxycarbonyl-O-ethyl-amidinocarbamate or
  $N^1$-4-chlorophenyl-$N^2$-methoxycarbonyl-O-methylamidinocarbamate or
  $N^1$-4-chlorophenyl-$N^2$-ethoxycarbonyl-O-ethylamidinocarbamate.
1 part of octylphenoxyethylene glycol with 9–10 mols of ethyleneoxy per mol of Phenol
94 parts of ethyl cellulose are mixed together. This concentrate can be diluted with water to give emulsions in concentrations suitable for plant protection.

Granules

The following substrances are used to manufacture 10 percent granules:
10 parts of
  $N^1$-n-butyl-O-methyl-amidinocarbamate or
  $N^1$-n-octyl-O-methyl-amidinocarbamate or
  $N^1$-n-dodecyl-O-methyl-amidinocarbamate or
  $N^1$-[3-(n-dodecylamino)-propyl-(1)]-O-methylamidinocarbamate or
  $N^1$-n-tetradecyl-O-methyl-amidinocarbamate or
  $N^1$-phenyl-$N^2$-ethoxycarbonyl-O-ethyl-amidinocarbamate or
  $N^1$-4-chlorophenyl-$N^2$-methoxycarbonyl-O-methylamidinocarbamate or
  $N^1$-4-chlorophenyl-$N^2$-ethoxycarbonyl-O-ethylamidinocarbamate.
3 parts of polyethylene glycol
2 parts of silica
85 parts of limestone grit (diameter: 0.4 to 0.8 mm).

The active substance is intimately mixed with the additives and ground in suitable devices.

The following Examples illustrate the invention. Appended thereto are further amidinocarbamates comprised by the formula I together with their physical data. They are manufactured analogously to the route described in the preceding Examples.

EXAMPLE 1

A solution of 20.6 g of N,N′-bis-(methoxycarbonyl)-S-methylisothiourea, 24.2 g of N-dodecylpropylenediamine and 100 ml of methanol are heated under reflux for 11 hours.

The clear reaction solution is evaporated and the residue recrystallised from 200 ml of acetone to give the active substance No. 1 of the formula $$\text{n-C}_{12}\text{H}_{25}\text{-NH-(CH}_2)_3\text{-NH-}\overset{\overset{\displaystyle NH}{\|}}{C}\text{-NH-COOCH}_3$$

The bis-chlorohydrate of the active substance No. 1 melts at 155°–157°C (recrystallisation from methanol/ethyl acetate).

The following compounds are manufactured by means analogous to those employed in Example 1:

| Active Substance No. | | m.p. °C |
|---|---|---|
| 2 | $\text{n-C}_4\text{H}_9\text{-NH-}\overset{\overset{\displaystyle NH}{\|}}{C}\text{-NHCOOCH}_3$ | 72–76 |
| 3 | $\text{n-C}_4\text{H}_9\text{-NH-}\overset{\overset{\displaystyle NH}{\|}}{C}\text{-NHCOCC}_2\text{H}_5$ | 67–70 |
| 4 | $\text{n-C}_8\text{H}_{17}\text{-NH-}\overset{\overset{\displaystyle NH}{\|}}{C}\text{-NH-COOCH}_3$ | 47–49 |
| 5 | $\text{n-C}_{10}\text{H}_{21}\text{-NH-}\overset{\overset{\displaystyle NH}{\|}}{C}\text{-NH-COOCH}_3$ | 60–62 |
| 6 | $\text{n-C}_{10}\text{H}_{21}\text{-NH-}\overset{\overset{\displaystyle NH}{\|}}{C}\text{-NH-COOC}_2\text{H}_5$ | 70–72 |

| Active Substance No. | | m.p. °C |
|---|---|---|
| 7 | n-$C_{12}H_{25}$-NH-C(=NH)-NH-COO$C_2H_5$ | 69-72 |
| 8 | n-$C_{12}H_{25}$-NH-C(=NH)-NH-COOC$H_3$ | 77-79 |
| 9 | n-$C_{14}H_{29}$-NH-C(=NH)-NH-COOC$H_3$ | 77-79 |
| 10 | $C_6H_5$-CH$_2$-NH-C(=NH)-NH-COOC$H_3$ | 129-131 |
| 11 | n-$C_8H_{17}$-NH-CH$_2$CH$_2$CH$_2$-NH-C(=NH)(NH-COOC$H_3$) | 102-104 |

EXAMPLE 2

29.6 g of S-methyl-methoxycarbonyl-isothiourea (0.2 mols) and 30.0 g of aniline (0.3 mols) in 100 ml of absolute benzene are heated under reflux for 7 hours. The mixture is then evaporated in vacuo and the residue taken up in 700 ml of ether. The solution is filtered until clear and the reaction product $N^1$-phenyl-O-methyl-amidinocarbamate (active substance No. 12) is allowed to crystallise out by cooling. Colourless crystals are obtained with a melting point of 113°–135°C.

EXAMPLE 3

15.2 g of thiourea (0.2 mol) and 15.9 g of dimethyl sulphate in 10 ml of water are heated for one-half hour under reflux. The mixture is cooled to −3°C and 35.1 g of chloroethyl formate (0.37 mol) are rapidly added dropwise. Then at 25°C a total amount of about 75 ml of 25% sodium hydroxide solution is added dropwise in such a manner that the pH does not exceed 7.0 and the temperature 25°C.

To this reaction mixture are then added 18.6 g of aniline (0.18 mol) and 100 ml of methanol. The whole mixture is heated under reflux for 4 hours. evaporated in vacuo and the residue crystallised from methanol. The reaction product $N^1$-phenyl-$N^2$-methoxy-carbonyl-O-methylcarbamate (active substance No. 13) has a melting point of 88°–89°C.

The following compounds are manufactured by means analogous to those described in Example 3:

| | | m.p. |
|---|---|---|
| Active Substance No. 14 | C$_6$H$_5$-NH-C(=N-COO$C_2H_5$)(NH-COO$C_2H_5$) | 70 - 71° |
| Active Substance No. 15 | Cl-C$_6$H$_4$-NH-C(=N-COOC$H_3$)(NH-COOC$H_3$) | 123 -125° |
| Active Substance No. 16 | Cl-C$_6$H$_4$-NH-C(=N-COO$C_2H_5$)(NH-COO$C_2H_5$) | 83 - 84° |
| Active Substance No. 17 | 2,Cl-C$_6$H$_3$-Cl-NH-C(=N-COOC$H_3$)(NH-COOC$H_3$) | 144 -146° |
| Active Substance No. 18 | CH$_3$-C$_6$H$_4$-NH-C(=N-COO$C_2H_5$)(NH COO$C_2H_5$) | 73 - 74° |

EXAMPLE 4

The fungicidal action of the new active substances was ascertained e.g. by means of the following tests:

a. Action against *Erysiphe chichoracearum* (cucumber mildew) on cucumbers (*Cucumis sativa*)

Young cucumber plants were sprayed with a spore suspension of cucumber mildew after they had been sprayed dripping wet with a 0.1 percent suspension of the active substance formulated as wettable powder and after the spray coating had dried. They were subsequently kept in a greenhouse at about 23°C. The degree of attach (extent of the leaf surface coated with the mycel coating) on the infected, treated leaves was assessed after 8 days in comparison to untreated infected controls.

The active substance No. 2 manufactured according to Example 1 displayed in this test very good action against Erysiphe cichoracearum.

b. Action against *Alternaria solani* on tomatoes (*Solanum lycopersicum*)

After being reared for 3 to 4 weeks in a greenhouse, tomatoes of the variety "Lucullus" were sprayed dripping wet with the test substance in the form of a spray broth (concentration: 0.1 percent of active substance) and, after the spray coating had dried, infected with a standardised spore suspension of the fungus. After being kept for about 5 days in a humid atmosphere at about 22°C, small black infection specks develop on the leaves. The number of specks was employed as a basis for evaluating the results of the test.

The active substances manufactured according to Examples 1 and 3 displayed in this test very good action against Alternaria solani.

c. Action against *Botrytis cinerea* on *Vicia faba* (Broad beans)

Fully developed, uniformly large leaves of *Vicia faba*, which have been sprayed dripping wet from a spraying device with a broth (0.01 percent content of active substance) prepared from an active substance formulated as a wettable powder, were placed three at a time in Petri dishes lined with filter paper. When the leaves were dry again, they were infected with a freshly prepared, standardised spore suspension of the fungus. After the leaves had been kept for 1 to 2 days in a humid atmosphere at 18° to 20°C, they displayed black, initially dotshaped specks which rapidly spread. The number and size of the infected areas served as a yardstick for determining the effectiveness of the test substance.

The active substances No.'s 1, 9, 14, 15 and 16 manufactured according to Examples 1 and 3 displayed in this test excellent action against *Botrytis cinera*.

d. Action against *Uromyces appendiculates* (bean rust) on beans (*Phaseolus vulgaris*)

Bean plants in the 2-leaf stage were sprayed until dripping wet with a suspension of the active substance formulated as wettable powder (concentration = 0.01% of active substance). After the spray coating had dried, the plants were infected with a fresh spore suspension of bean rust (5 plants per product) and then kept for 1 day in a humid chamber, then in a greenhouse at 20°–22°C.

The number and size of the rust pustules present after about 8 to 12 days served as a yardstick for evaluating the test.

The active substances No.'s 1 and 4 manufactured according to Example 1 displayed in this test excellent action against Uromyces appendiculates.

e. Action of *Piricularia oryzae* Bri. et Cav. on rice

Rice plants were reared in a greenhouse and sprayed once prophylactically with an aqueous spray broth containing 0.1 percent of the active substance No. 1. Two days later the thus treated plants were infected with an aqueous conidia suspension of Piricularia oryzae Bri. et Cav. and incubated in a humid chamber. The treated plants were examined for attach by fungus after 7 days.

The active substance No. 1 displayed in this test very good action against *Piricularia oryzae* Bri. et Cav.

I claim:

1. A compound of the formula

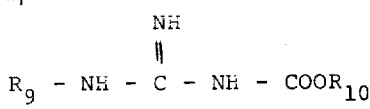

in which $R_9$ represents a straight chain alkyl radical containing from 4 to 15 carbon atoms which is interrupted by -NH-, and $R_{10}$ represents methyl or ethyl.

2. The compound according to claim 1 of the formula

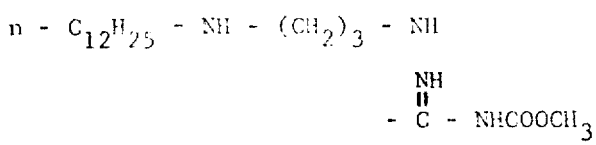

3. The compound according to claim 1 of the formula

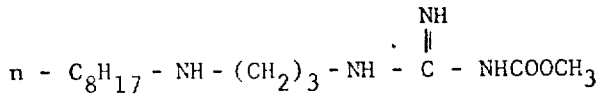

* * * * *